(12) United States Patent
Bierner et al.

(10) Patent No.: US 12,147,425 B2
(45) Date of Patent: Nov. 19, 2024

(54) SEARCH-RESULT EXPLANATION SYSTEMS AND METHODS

(71) Applicant: Ancestry.com Operations Inc., Lehi, UT (US)

(72) Inventors: Gann Bierner, Oakland, CA (US); Robert Weis, Oakland, CA (US); Kevan Craig McGowan, Oakland, CA (US); Joel Edward Hobson, Daly City, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 141 days.

(21) Appl. No.: 17/950,897

(22) Filed: Sep. 22, 2022

(65) Prior Publication Data

US 2023/0086791 A1  Mar. 23, 2023

Related U.S. Application Data

(60) Provisional application No. 63/316,090, filed on Mar. 3, 2022, provisional application No. 63/247,550, filed on Sep. 23, 2021.

(51) Int. Cl.
*G06F 16/20* (2019.01)
*G06F 16/22* (2019.01)
*G06F 16/2453* (2019.01)
*G06F 16/2457* (2019.01)

(52) U.S. Cl.
CPC .... *G06F 16/24535* (2019.01); *G06F 16/2228* (2019.01); *G06F 16/24575* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 7,603,348 B2 * | 10/2009 | He | G06F 16/24575 |
| 7,752,195 B1 * | 7/2010 | Hohwald | G06F 16/2453 |
| | | | 707/723 |
| 8,185,544 B2 * | 5/2012 | Oztekin | G06F 16/353 |
| | | | 707/726 |
| 9,098,569 B1 * | 8/2015 | Bhagat | G06F 16/9535 |
| 2008/0005106 A1 * | 1/2008 | Schumacher | G06F 16/24556 |

(Continued)

*Primary Examiner* — Belix M Ortiz Ditren
(74) *Attorney, Agent, or Firm* — Keller Preece PLLC

(57) ABSTRACT

Search-result explanation systems, methods, and computer-program products receive a user search query, expand the search query into a plurality of sub-queries, perform a database search using the expanded user search query, and determine which sub-queries of the plurality of sub-queries matched with a particular search result. Results from the database search are re-indexed in an index generated on-the-fly and in-memory, within which the results are searched using the sub-queries to determine matching fields and match types. A score is determined based on the type of match(es) with a particular search result based on one or more predefined weights and normalized using a denominator comprising a fictitious, on-the-fly record configured to receive a perfect score according to the received user search query. A user interface showing ranked results and explanations for the ranking, including a score for the result based on the expanded user search query.

20 Claims, 9 Drawing Sheets

(56) References Cited

U.S. PATENT DOCUMENTS

2010/0023509 A1* 1/2010 Adachi ............ G06F 16/24534
  707/E17.014
2015/0347417 A1* 12/2015 Hohwald ............ G06F 16/2453
  707/723

* cited by examiner

FIG. 2A

SEARCH-RESULT EXPLANATION SYSTEMS AND METHODS

CROSS-REFERENCE TO RELATED APPLICATIONS

The present application claims priority to and the benefit of U.S. Provisional Patent Application Ser. No. 63/247,550, filed Sep. 23, 2021, entitled "Search-Result Explanation Systems and Methods," and U.S. Provisional Patent Application Ser. No. 63/316,090, filed Mar. 3, 2022, entitled "Search-Result Explanation Systems and Methods", each of which is hereby incorporated by this reference in its entirety.

FIELD OF THE DISCLOSURE

The disclosure relates to systems, computer program products, and/or methods for facilitating, conducting, and/or providing search-result explanations.

BACKGROUND

Searching for and identifying a desired datum, record, result, or otherwise using a search engine or search modality can be an enormously complex endeavor for both user and search provider, particularly where the user is searching for a proverbial needle in a haystack. In large databases like family history-related records, the user is often searching for a needle in a stack of needles, as family history databases may contain tens or hundreds of billions of records and hundreds of millions or even billions of tree persons in family trees, and a user may be searching for a vital record or other datum corresponding to a specific ancestor.

Entering a broad search for a desired record, such as a record in a genealogical research service pertaining to "Grandpa John," who was born sometime around 1930, may return tens or hundreds of thousands of potentially relevant results. This is practically impossible for a user to manually parse. Relevant results may be buried deep in the results set where the user will never find them, reducing the chances a user will actually locate a desired result and have a meaningful experience and connection on the genealogical research service. Even to the extent that certain dogged users manually sift through a large volume of results, they are liable to suffer from fatigue and sensory overload, increasing the risk that the user may not recognize a relevant result when they eventually find one.

An additional problem for users of existing search modalities is the time and effort required to evaluate a result to determine its relevance to the query. While certain existing search modalities, such as Google search, sometimes provide a three- or four-line preview of the content of a result, there no intuitive and accessible way for a user to easily and effectively gauge the relevance of the result vis-à-vis specific components of the search query, but rather the user must spend time opening and examining the result to determine whether and how well it actually pertains to the search query. This slows down the process of reviewing the results, particularly in difficult searches where the results have low precision.

While Google searches currently provide a feature that indicates a few details about a result in an interface, such as details about a source website, geographical regions in which the result appears to be relevant, the language in which the result is published, and whether a search term appeared in the result, there is no explanation of how the search term and the result matched: for example, whether a particular field in the result is an exact match to a particular search term (and which search term) and if not, what type of match was established. A user is at a loss of how to improve their search or gauge the possible relevance of the result without opening the result and trying to gauge its potential relevance to the query.

While more-specific search techniques may help a user to narrow the number of results, most users are not experts in search techniques generally or best practices of field-specific research such as genealogical research, and may struggle to properly utilize the available tools for conducting a focused and more-efficient search of a large database. Indeed, genealogical research is a highly nuanced and specialized field, with practitioners being highly trained and experienced in a wide variety of record types, sources, historical contexts, types of search, and otherwise. Such users are equipped for specific searches. By contrast, a casual user may not understand the concept of "fuzzy" searching, "phonetic" searching, and "exact" searching, and even if they do, they may not be aware of how a particular search provider applies such search modalities; further, in the process of experimenting with such search modalities, the user may inadvertently complicate or interfere with the search process.

The user may miss out on important results and/or receive so many results that they are unable to identify a relevant result in the large "stack of needles" returned by the search tool. This is detrimental both to the user, who is not able to locate the desired information and may give up on their search and the search provider, and to the search provider, whose user misses out on an engaging and satisfying experience.

Existing search modalities, such as Solr, are configured to provide results based on a user's query without providing an explanation for why particular results were returned. As a result, a user may be completely unaware of their use, and sometimes their continued use, of suboptimal search techniques and, in turn, the user may be at a loss for how to improve their research practices. This perpetuates the disadvantages to both users and search providers of existing search practices and modalities which are poorly suited to guiding a user through their search. Even for enterprise users, such as a company implementing modalities such as Solr for their database and search capabilities, determining which component of a user's query matched any given reference in a set of results is enormously difficult and costly if not impossible.

While existing search modalities generally rank results automatically by relevance or other pertinent metrics, a user has no insight into how one or more components of their search query yielded the results and/or the ranking.

In view of the foregoing, there is a need for an improved system, computer-program product, and/or method for search-result explanations.

SUMMARY

Embodiments of systems, computer-program products, and methods for search-result explanations advantageously address the drawbacks of existing search modalities by providing explanations of the search results tied to a user's query. In embodiments, the explanations are tied to one or more specific components of a user's query. A score for a particular result as a whole and/or for particular query components vis-à-vis the contents of the result and/or the query are determined and optionally presented to the user.

The search-result explanation embodiments advantageously provide a module or section for query tips based on the query components and the search results. For example, the embodiments may determine, based on the query components and the number and quality of search results, that the user would be well-served by narrowing a particular component of the search query, by broadening a particular component of the search query, and/or by changing other aspects of the search query to maximize recall (i.e. to ensure that as many relevant results in the database as possible are returned) and/or to improve precision (i.e. to maximize the proportion of the returned results that are relevant). The module or section may be accessed by hovering over, clicking on, or accessing a button or icon associated with any given result. Other alternatives are contemplated as well.

For example, in a low-precision set of results where a top-rated result matched on initial rather than exact for the given name and indicated an irrelevant result, the search-result explanation embodiments may be configured to display a determined search-improvement suggestion, for example "The top-rated match was based on an initial match for the given name. If you would like to filter out initial matches, use the slider feature to require an exact or phonetic match for the given name." Likewise, or alternatively, the embodiments may be configured to present the user with the option to automatically or intuitively accept the suggested change by, for example, clicking a button that reads "Update Search Query."

Search-result explanation embodiments may be configured to receive a query from a user, which may be a multi-field search. In embodiments relating to genealogy, such as family history-related records and research, the fields of the query may include one or more of first or given name, last name, place where a person lived, date of birth, date of death, date of marriage, name of father, mother, siblings, spouses, or children, keyword (such as occupation, street address), gender, race/nationality, collection focus, combinations and/or modifications thereof, and/or any other suitable field. The user may further be provided with the option to search for exact matches for one or more query fields, such as given and middle name, last name, place where a person lived, location of any particular event, combinations thereof, and/or other suitable search queries.

It will be appreciated that while genealogy has been described, the principles of the disclosure may apply to any suitable field involving searching, including generic search engines like Google, metasearch engines like Dogpile, semantic search engines, academic search engines, individual sites such as sites that utilize a search modality like Solr, combinations and/or modifications thereof, or any other suitable search modality.

When a user's search query has been received, the search query may be expanded into one or more discrete internal queries by a service layer of the search modality. That is, the search query may contain a plurality of terms corresponding to specific fields; by expanding and/or discretizing the search query into internal query components, the embodiments are enabled to associate specific query components with specific results and result components. The service layer may further be configured to federate the queries onto nodes of a database and to collate the results obtained therefrom.

To expand the search query, the received user search query is expanded to one or more types of matches, for example "exact" matches, "initial" matches, "phonetic" matches, "fuzzy" matches, modifications thereof, and/or any other suitable match types. Embodiments may have a default setting where, absent receiving a user specification to the contrary, the query components are automatically expanded and searched for each of exact, initial, and phonetic matches. The match types may be ranked such that exact matches are better than phonetic matches which in turn are better than initial matches, for example. This may be performed for one or more fields of the search, including names, locations, and dates. The expanded query is then passed to a search modality, for example Solr, to search one or more nodes or databases for potentially relevant results.

Phonetic searches may be based largely on consonants rather than vowels, in embodiments, and fuzzy searches may utilize edit distance. For example, an "edit distance" may be defined as: how many characters would have to be added, deleted, or swapped for a string to be the same as another string. An edit distance of 1 may indicate that only one character would have to be added, deleted, or swapped for two strings to be the same. Fuzzy searches may be or comprise edit distance plus a phonetic match, such that fuzzy1 is a phonetic match plus an edit distance of 1, fuzzy2 is a phonetic match plus an edit distance of 2, and so on. Purely "edit distance" searches may be used. Any suitable search types may be used.

Suitable matches on names may include one or more of the following match types: n_exact where the $n^{th}$ term matched exactly (an "exact match" or "exact"), n_fuzzy1 where the $n^{th}$ term matched phonetically but with only 1 character different based on edit distance (a "similar match" or "similar"), n_fuzzy 2 where the $n^{th}$ term matched phonetically but with only 2 characters different based on edit distance (also a "similar match"), n_phonetic where the $n^{th}$ term matched phonetically (also a "similar match"), n_authority where the $n^{th}$ term matched based on the name authority file (similar name)(a "name variation" match or "name variation"), n_surnameTrailingS for matching similar names with the letters on the end (e.g. Matthew and Matthews) (also a "name variation" match), n_surnamePrefix for matching similar names that may or may not have a prefix like "van," "von," "mc," etc. (also a "name variation" match), n_soundex|daitchMokotoff where the $n^{th}$ term is matched based on a particular phonetic algorithm (in embodiments for surname only) (also a "similar match"), n_initial where the $n^{th}$ term matched just based on the initial character (in embodiments for given name only) (a "matching initial match" or "matching initial"), n position where the $n^{th}$ term matched the $n^{th}$ term in the field, e.g. matched a first name to a first name, not a first name to a middle name (also an "exact match" when all terms matched all corresponding positions in the field, otherwise also a "similar match"), n_wildcard where the $n^{th}$ term matched via a wildcard query (e.g. "sm*") (a "wildcard match" or "wildcard"), n/m_type1/type2 for providing a boost for bigram matching (for example "Smyth Jones" matching "Smith Jones" would yield "0/1_fuzzy1/exact", affix where the name matched a variation of a name that starts with something like Mac or Von (e.g. MacDonald vs. Mac Donald), mismatch where the name is different from the one specified (a "different match" or "different"), mismatch-middle where the middle name is different form the one specified (also a "similar match"), keyword where the name field matched a keyword search (a "keyword match" or "keyword"), or any other suitable type, combination, or alteration of match type.

Suitable matches on dates may include exact where the date matched exactly (an "exact match"), month where the date matched the month and year but not the day (a "similar match"), year where the date matched the year but not the month (also a "similar match"), +n where the date in the query was n years more than in the field, −n where the date in the query was n years less than in the field, mismatch-month|exact where the month or the day is different from the one specified, mismatch where the whole date is mismatched (a "different match" or "different"), or any other suitable type, combination, or alteration of match type.

Suitable matches on places may include n where the $n^{th}$ term (starting from the right) in the query's place matched (an "exact match" when all terms matched all corresponding positions in the field, otherwise a "similar match"), n-m where terms n through m (starting from the right) all matched together (also an "exact match" when all terms matched all corresponding positions in the field, otherwise also a "similar match"), mismatch where the place is not the same (a "different match" or "different"), exact where the place matched the text of the query exactly as entered (also an "exact match"), keyword where the field matched a keyword search (an "exact" or "keyword match"), KnownPlacesbyLevel_n where the primary place of the result matched this place at the specified level (e.g. 5=State), so as to prefer records from places that are mentioned in the query even if there is no specific event match, where different levels of places such as state, city, county, etc. may have greater or lesser impact on the search, KnownPlaces_[event] where the primary place of a result matched this place for a specified event such as birth, or death, and which may be used to prefer records from places that are mentioned in the query even if there is no specific event match, where different types of events may have greater or lesser impact on the search, or any other suitable type, combination, or alteration of match type.

Suitable matches on normalized places may include exact where the normalized place matches exactly, n where the normalized place matched at level n (e.g. 5 for state), n_adj where the normalized place matched an adjacent place at level n (e.g. at level 5, searched for California and matched Nevada), or any other suitable type, combination, or alteration of match type.

Suitable matches on gender may include opposite, where the search matched the opposite gender, or not-opposite, where if no constraints are placed on gender by the user, the system sets it to "must if present," where if a gender is in a result it must be the gender in the query, or any other suitable type, combination, or alteration of match type.

Suitable matches on free text may include n_exact where the field matched the $n^{th}$ term of a surname in keyword search (an "exact match" when all terms matched all corresponding positions in the field, otherwise a "similar match"), exact_slop0|slop1|slop1rev which provides several ways of matching full names in a free text field, e.g. searching "John Smith" matches "John Smith," "John A Smith," and "Smith, John" (an "exact match" when all terms matched all corresponding positions in the field, otherwise a "similar match"), or any other suitable type, combination, or alteration of match type.

Suitable matches on keyword searches may include exact where the field matched a keyword search (an "exact keyword match" or "exact keyword" or "keyword" or "exact"), wildcard where the field matched a wildcard search (a "wildcard match"), or any other suitable type, combination, or alteration of match type.

The search-result explanation embodiments may be configured to receive one or more results based on the expanded query and to re-index one or more of the results, in embodiments, in memory, on the fly, or in real-time. An advantage of on-the-fly determination of search result explanations is that in circumstances where a user specifies that they do not wish to receive and/or an enterprise specifies that they do not wish to provide search result explanations, such functionality may be deactivated and the corresponding computing resources preserved.

In embodiments, this may be done for each result in the result set. This allows the embodiments to extract each component of the expanded query and check, e.g. search, for matches within the re-indexed result. The embodiments thus determine whether the result matched a component of the query exactly, phonetically, by initial, or otherwise. In embodiments, the search-result explanation embodiments may be configured to determine which token of a result matched the expanded query component. It was surprisingly found that this procedure of re-indexing each result in a set of results, storing the same in memory, and then searching the re-indexed results to determine which components of an expanded search matched components of a result was not feasible using existing search modalities.

That is, to determine how a query or a component thereof matched a search result, a list of results retrieved by or using the search modality for a given query (which utilizes a general or large index for a database or collection of documents/data) is received. In other words, the user's query is used by the search modality against or using an index for a database to determine one or more potentially relevant results, e.g. documents. However, most search modalities do not provide information about how or why each potentially relevant result obtained using the general index from the database matched any given component of a multi-field query.

Furthermore, due to computing-resource and cost concerns, it is not feasible to search each individual component of a query, using the general index for a database to determine which of the potentially relevant results matched on that particular component. As such, the search results are re-indexed in, in embodiments, a new in-memory index created, in embodiments, on-the-fly, just for the potentially relevant results. The use of a new index for the potentially relevant results advantageously recreates the exact environment of the original search, thereby ensuring fidelity between the identified matches between components of the query and fields/tokens of results. Moreover, the new index can be created in a fraction of a second, saving cost and resources by avoiding unnecessary requests or uses of the general index of the database.

The query components may thus be checked for various match types against multiple potentially relevant results, in embodiments simultaneously, thereby reducing latency and use of computing resources. Re-indexing potentially relevant results facilitates precise and efficient identification of matches and match types between individual query components and results of a set of potentially relevant results using individual components of a query. Furthermore, this advantageously facilitates identifying, retrieving, and providing content from individual results, such as the tokens of a field that matched a particular query component, to a user to highlight potentially dispositive content or data of the result. The type of match for a result helps determine a score for the record.

In embodiments, the scores for particular results and/or for particular matches between query components and results/content thereof may be normalized to a desired scale, such as between 0 and 1 (though this merely exemplary and non-limiting), where zero means there was no match whatsoever, and 1 indicates a perfect match. To do so, a "perfect record" for a particular query is generated. The "perfect record" will perfectly reflect the query and return a perfect match for each component, which allows for a benchmark by which to compare actual matches between 0 and 1. This has been surprisingly found to allow for improved utilization and economies of processing resources, reduction in latency, and improved experiences for the user. The generated "perfect record" may be generated on the fly and stored in memory and may contain only or substantially only the query components.

The search-result explanation embodiments may utilize a set of weights to determine a score for different types of matches. Using the identified matches described above (e.g. whether a searched-for given name was an exact match or phonetic match), the weights may be applied to determine a score. Thus, an exact match on first name will have a particular weight and resulting score and an initial match on surname will have a particular weight and resulting score; these may be compared—as a numerator—against the generated "perfect record"—which forms a denominator—to determine a score for the result vis-à-vis the query and a "perfect record." That is, the score determines how close a matched record is to a hypothetical "perfectly matched" record.

Similarly, different weights may apply to different types of location matches, such as exact, adjacent, regional, etc. For places, each level of a place (such as city, county, state, etc.) is assigned a different score, and in embodiments more-specific places get higher scores. This operation may vary by each query, as each query and set of returned results may be different. For example, a query with a particular combination of first and last name search (and by different specified breadth of search), location, record type, etc. will vary in how records are matched from a second query with another combination of last name search at a different breadth, birth date, and death date.

The weights may be dynamic and vary by record type. Weights may be machine learned and/or rule-based, as the case may be, and as suitable for a particular application. As an example of a rule-based weight, greater weight may be placed on location and on birth date than on given name, surname, and/or death date, as a user who searches for their uncle "Joe Johnson," a Utah native who is still alive, would be more likely interested in seeing "Joseph Johnson" from Utah (a fuzzy match on given name but an exact match on location) than "Joe Johnson" from Maine (an exact match on given name but not a match on location), and on "Joseph Johnson" born in 1951 (a fuzzy match on given name but an exact match on birth date) than on "Joe Johnson" born in 1865 (an exact match on given name but very wrong on birth date). It will be appreciated that this is merely exemplary and non-limiting.

Inferences are used in embodiments and may be provided as explanations to a user. For example, an inference may be made based on surnames, such as when matching a result to a person based on a match that is determined based on a spouse's surname (which the person of interest in the search may have taken). Other inferences are contemplated within the disclosure. Such inferences may be explained and/or displayed to a user as an explanation for why a search query component matched on a particular component of a particular record. For instance, an explanation for a spousal surname inference may read "We inferred the married name of this person from their spouse, and this match was made based on the inferred married surname."

In embodiments, machine-learned parameters such as weights are utilized for records of a particular type and rule-based weights are utilized for records of a different type. In embodiments, both machine-learned weights and rule-based weights are utilized in parallel with a comparison performed on the detected score to determine which score to rely on for a particular search. Thresholds, rules, and/or machine learning models may be utilized in such cases to determine which score should be relied upon.

Scores may be determined additively, using an average value of the scores for different components, using a complex formula (e.g. a machine-learned formula), or by any other suitable method. In embodiments, a consistent formula is used in a particular result set and/or between numerators and denominators, i.e. "perfect records." That is, whichever formula for determining a final score is used for the perfect record, the same formula is used for the numerator, i.e. the received results, and vice versa.

As a result, the user (i.e. the searcher) may receive insight regarding which components or terms of a search query matched a particular result in a set of results, and how the terms of a search query matched the result. In embodiments, the particular field of the result that was determined to be a particular type of match is also shown to the user. So, for example, a user may enter a search for genealogical records pertaining to an ancestor named "Heikichi Izuka," born in Japan, and more-easily determine using the system, method, and computer-program product embodiments described herein whether a particular result in a set of results is worth delving into.

A result that matched the given name Heikichi only on initial H and the surname exactly, therefore, may be deemed to be unlikely to be an actual match given the number of records pertaining to persons with the surname Izuka and a given name starting with H, such that the user may quickly gloss over such results when conducting research without having to manually determine that the result is impertinent. Further, in embodiments, the system, method, and computer-program product embodiments described herein may display a field from the result that contained a possible match; this information may further yield valuable insights without the manual effort of carefully inspecting the result.

Likewise, a user searching for their uncle "Joe Johnson," born in New Jersey, may quickly and intuitively discern using the system, method, and computer-program product embodiments described herein that even though a result matched exactly on given name and surname, a record pertaining to a "Joe Johnson" born in Australia rather than New Jersey is almost certainly not a pertinent record and may gloss over such a record, expediting the research process. A user searching for an ancestor named "Joe Johnson" from "Missouri," by contrast, may find a result that matched, as determined and shown using the system, method, and computer-program product embodiments described herein, based on an adjacent location (e.g. Arkansas), potentially relevant due to the possibility that great-uncle Joe lived or spent time in neighboring Arkansas, resulting in a genealogically pertinent record such as a marriage, birth, or death certificate; such a result may be actually relevant to that ancestor and therefore worth investigating. This is advantageously possible without a user having to click on, open, or peruse a corresponding record to preview and glean details, such as birth date, that would allow a user to easily eliminate the record, thus saving time and computing resources for both user and search provider.

These features, advantages, and uses of the system, method, and computer-program product embodiments may ultimately allow a user to improve their search strategy and search skills by observing which types of search queries yield promising results. The user may observe from the search-result explanations that a particular search strategy is particularly effective and replicate such strategy in other searches. Similarly, the user may observe from the search-result explanations that a particular search strategy is ineffective based on the impertinence of its results and thereby tighten up or otherwise alter one or more search queries. If the above example pertaining to Heikichi Izuka from Japan is unfruitful, for instance, the user may discern that additional details regarding, for example, birth date or a more-specific birth location should be provided and/or a more-exact match on one or more fields may be necessary.

These and other features of the present disclosure will become better understood regarding the following description, appended claims, and accompanying drawings.

BRIEF DESCRIPTION OF THE DRAWINGS

FIG. 2A is a search result interface according to another embodiment of the present disclosure.

Figure 1:
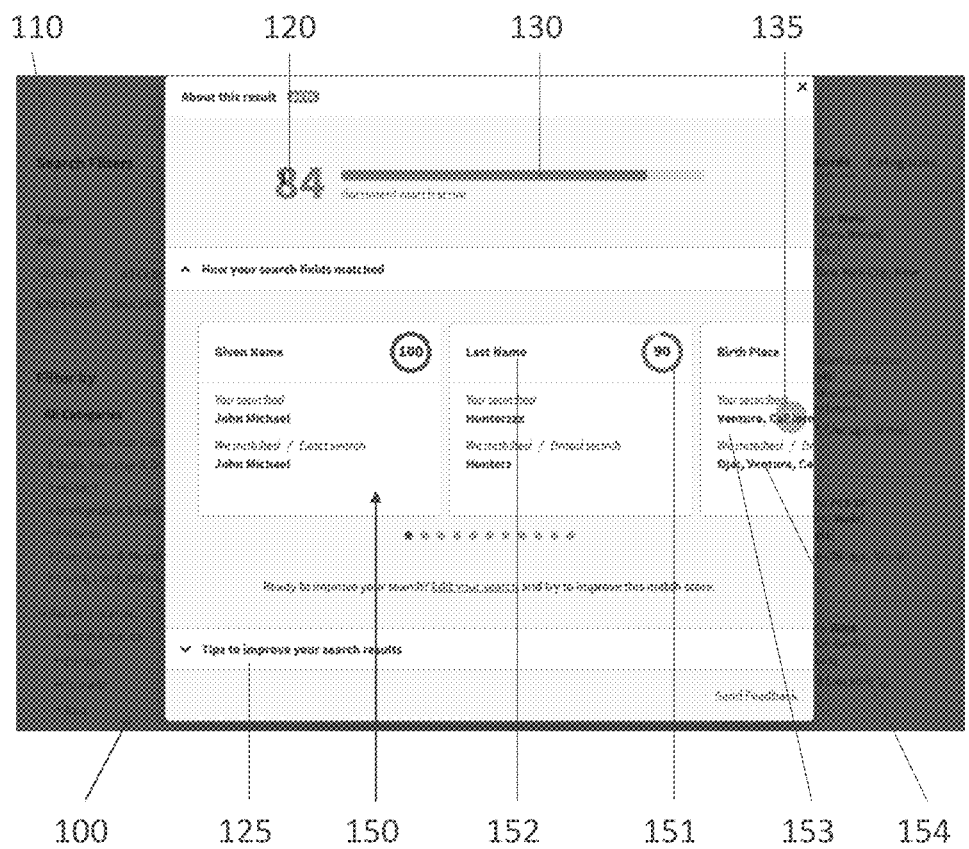
FIG. 1 is a search result interface for search-result explanations according to embodiments of the present disclosure.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of search-result explanation systems and methods, and in no way limit the structures, configurations, or functions of search-result explanation systems and methods and components thereof according to the present disclosure.

DETAILED DESCRIPTION OF VARIOUS EMBODIMENTS

A. Introduction

Although the embodiments of the disclosure are adapted for providing search-result explanations in response to search queries of databases, it will be appreciated that the principles of the disclosure may be adapted to any suitable application. Search-result explanations may be provided for users of search engines, database searches, site-specific searches, or any other tool, such as tools where a user enters a query and reviews results therefrom.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of a search-result explanation system and method, certain modules and features are described independently. The modules and features may be synergistically combined in embodiments to provide a search-result explanation system and method.

B. Embodiments of Search-Result Explanation Systems, Computer-Program Products, and Methods Embodiments of search-result explanation systems and methods address shortcomings in the art by providing a search-result explanation that provides users with information regarding why a particular result in a set of results matched a particular query, such as in family history or genealogy services. This allows users to more-quickly assess the relevance of a result (as a user can quickly assess from the search-result explanation whether the result is likely to have any relevance to their desired search target) and assists users with providing improved search queries.

The search-result explanation embodiments may provide a user interface that displays one or more components of a search-result explanation. The components may be displayed with a type of match vis-à-vis a particular result, a score, and/or other elements facilitating user understanding and/or improvement of the query and/or the results.

In embodiments, one or more fields of a record, in some embodiments all fields, that matched a query, including tokens of the field that matched the query, which part or component of the query that the fields/tokens matched, how the fields/tokens matched the query or component thereof, and/or inferred values that matched (such as a last name that matched based on an inferred married name from a spouse or an inferred name from a family member, such as a parent), may be determined and/or shown in the user interface.

The fields which are displayed in results may be determined dynamically based on the tokens/fields that matched component(s) of the query, a matched value for a field such as an alternate name may be provided or displayed, matched tokens in the result may be highlighted or otherwise provided, and matching fields/tokens and optionally types of matches therefor may be displayed or provided.

In embodiments, one or more fields of a result that matched a query on a keyword-specific search may be determined and/or shown, including what tokens in the field matched the keyword, and how. This may advantageously allow for dynamically determining which fields to display in results, highlighting matched tokens, and/or showing parts of a query that matched the keyword.

In embodiments, one or more fields of a result, such as a free text document such as newspapers, that match a query may be determined and/or displayed, such as by creating a snippet based on matched tokens, highlighting matched tokens, and/or indicating which tokens are, e.g., name matches vs. keyword matches.

In embodiments, fields of a result that did not match a query may be determined and flagged. In embodiments, based on a threshold, a result may be flagged to a user as "suspect" if the number of mismatched fields relative to the number of matching fields is sufficiently high. This advantageously alerts a user that a record that superficially appears promising is not a good match.

In embodiments, cases where the primary place of a result is contained in a query are determined, and in embodiments a specificity of the primary place (such as country, state, etc.) is determined. This may be flagged to a user, indicating that the result may be from a relevant place or location.

In embodiments, field scores may be determined based on how well a query component matches tokens of or the entirety of a field. Result scores may be determined based on how well one or more or all fields of the result match the query, with colors associated with varying quality thresholds. Score cutoff thresholds may be determined to show a break in a results list indicating where results that follow the break are of poorer quality or relevance.

The user interface may display recommendations determined for a user based on one or more queries and one or more results to help the user refine their search. For example, the user interface may suggest to a user to adjust the matching algorithms used in the search (such as fuzzy, soundex, etc.) and/or to exclude terms from the results using, e.g., a "not" functionality. This may be based on an automated identification of common fields/tokens in results that are determined not be relevant, e.g. based on the user opening and quickly moving on from a result and/or declining to save details therefrom to a pedigree or profile.

Turning to FIG. 1, a user interface 100 illustrating an embodiment of a search-result explanation system or method is shown. The user interface 100 may be superimposed on a search interface 110, but while superimposition has been shown, it will be understood that the user interface 100 may be shown adjacent to or separately from the search interface 110. In the search interface 110, a user may enter a search query having one or more components such as searching by given name, surname, gender, location, record collection, birth date, death date, and etc. One or more potential results may be provided to the user in the search interface 110. For example, a user may be utilizing a genealogical research service and the results may comprise one or more historical records that may contain information about the person such as an ancestor that the user is searching for and matching one or more of the search components.

The search-result explanation embodiments may determine a score for a particular record (e.g., a search-explanation score) which the user may access in any suitable way, such as by clicking on a corresponding icon. The score for the result may be the same as, included in, or distinct from a score according to which the results in the result set are ranked and ordered, e.g. by a database solution such as solr. The search-explanation score is determined, as described above, by determining which components of a search query matched particular components of the record, and comparing the matched components against a "perfect query" using suitable weights or other metrics. For example, the score 120 for a particular record may be an aggregation or other product of individual scores 151 of particular components 150. The score 120 may be shown in a particular color corresponding to a quality of the score, and may likewise be shown in a bar 130. The user may see each component 150 of their query in a carousel that is navigable by arrows 135 or by any other suitable arrangement, such as but not limited to a list, a table, or otherwise.

The components 150 may have individual scores 151 determined in any suitable way, such as by using rule-based or machine-learned weights. One component 150 may be a given name component of the query, which may be a perfect, i.e. 100, match, if the given name "John Michael" entered in the query exactly matches the given name "John Michael" identified from the resulting record. The last name component 152 of the query may be a strong but imperfect match, i.e. a score of 90, if the surname entered in the query 153 closely matches the surname 154 identified from the resulting, pertinent record. The components 150 may include each component of the query, such as birth place, death place, birth date, death date, gender, record collection, etc., as the case may be, and provide a score for each. The weights for each component and for each type of search (e.g. an Exact search for Given name compared to a Broad search for Surname) may vary and may be rule-based and/or machine-learned.

The carousel showing the components 150 advantageously provides a user with information about a result, such as a historical document like a Census record, and helps to determine the likely relevance of the record the user's search and intentions. For instance, a user can easily see whether a broad search for surname turned up an irrelevant result if the corresponding score or the surname identified in the record therefor is not a match. For example, the components 150 may indicate that the result matched on surname phonetically and/or was one year away from a specified birth or death year.

The components 150 may also highlight associated parts of the field or result that matched the query component, e.g. by highlighting the text or tokens in the result that matched the surname and/or specified year. Additionally, the user may discern from the scores that the query should be adjusted, for example tightening up the search on surname, for example by limiting the search to only exact or fuzzy matches and excluding initial matches which the user may determine are yielding irrelevant results, in order to narrow down the references. In embodiments, below a predetermined score threshold, an option for increasing the specificity of the corresponding query component may be provided. Thus if a surname matches only phonetically, an option may be provided to the user to retool their query to require an exact match on surname.

At 153, for example, the user may compare their entry in the query against a component 154 identified in the record, so as to know which components from the record are accurate and what exactly the record has to offer. Not shown is an explanation of why the component matched, e.g. whether the match for a particular component of a query and a part of a record was an exact match, broad, initial, fuzzy, etc., which varies by type of search term. Also included is a segment or module 125 for query tips that intelligently suggest improvements to the user's search based on, e.g., the number of close matches on a particular component (such as given name), which may necessitate tightening up the search on last name and/or birth place, for example, to narrow down the list of records returned for a common given name.

Turning to FIG. 2A, a search interface 200 includes a set 210 of results in response to a query, for example a query that includes each of a given name, birth date, surname, spouse name, and marriage date component. Each result 211 comprises a match score and explanation module 220. The explanation module 220 comprises icons 222 that correspond to a pertinent query component/record field 221. The icons 222 may have any shape, color, function, and/or arrangement for providing a preliminary and intuitive indication of the match quality of the query component. In an embodiment, the icons 222 may be shown as green for strong matches above a certain threshold, yellow for medium matches within a threshold, and red for poor matches below a certain threshold.

The query component/record field 221 is shown for each record where the query components were relevant. In the top-rated record, for instance, the given name "Haru," the birth date "1974," and the surname "Shiozawa" were identified in the record (in this case a death certificate record), and the corresponding accuracy is shown. Haru was an exact match, Japan was an exact match, and Shiozawa was an exact match, hence the same colors of icons 222. In embodiments, the exact token from the record that matches at some level one of the components of the query is highlighted or otherwise displayed in the record field 221. Thus a user can see that the result contained the actual text "Haru," "Japan," and "Shiozawa." All of these indicators can show a user that this particular result is promising and worth deeper investigation. By contrast, another result is included where the only matches were an initial match "H" on given name and a surname "Scacy," and the actual text "William H" and "Scacy" are highlighted from the result. The orange and yellow colors of the icons 222 reflect the poorer quality of these matches. This can help a user avoid wasting time investigating this particular result and to focus instead on results with more-pertinent content.

Figures 2B, 2C:
FIG. 2B is a search result interface according to the embodiment of FIG. 2A.
FIG. 2C is a search result interface according to the embodiment of FIG. 2A.

Turning to FIGS. 2B and 2C, an interface 250 may be displayed when a user clicks on or hovers over any particular part of the explanation module 220, such as a question mark icon 223. The interface 250 is overlaid or shown adjacent to the interface 200, or shown in any other suitable way. The interface 250 provides an explanation for specific query components 251 and the match between the field, i.e. entered, value 253 and the corresponding components 252 of a record, along with the type of match 254 and the score 255 of a match. A total score 256 for a record is also shown in embodiments.

Figure 3:
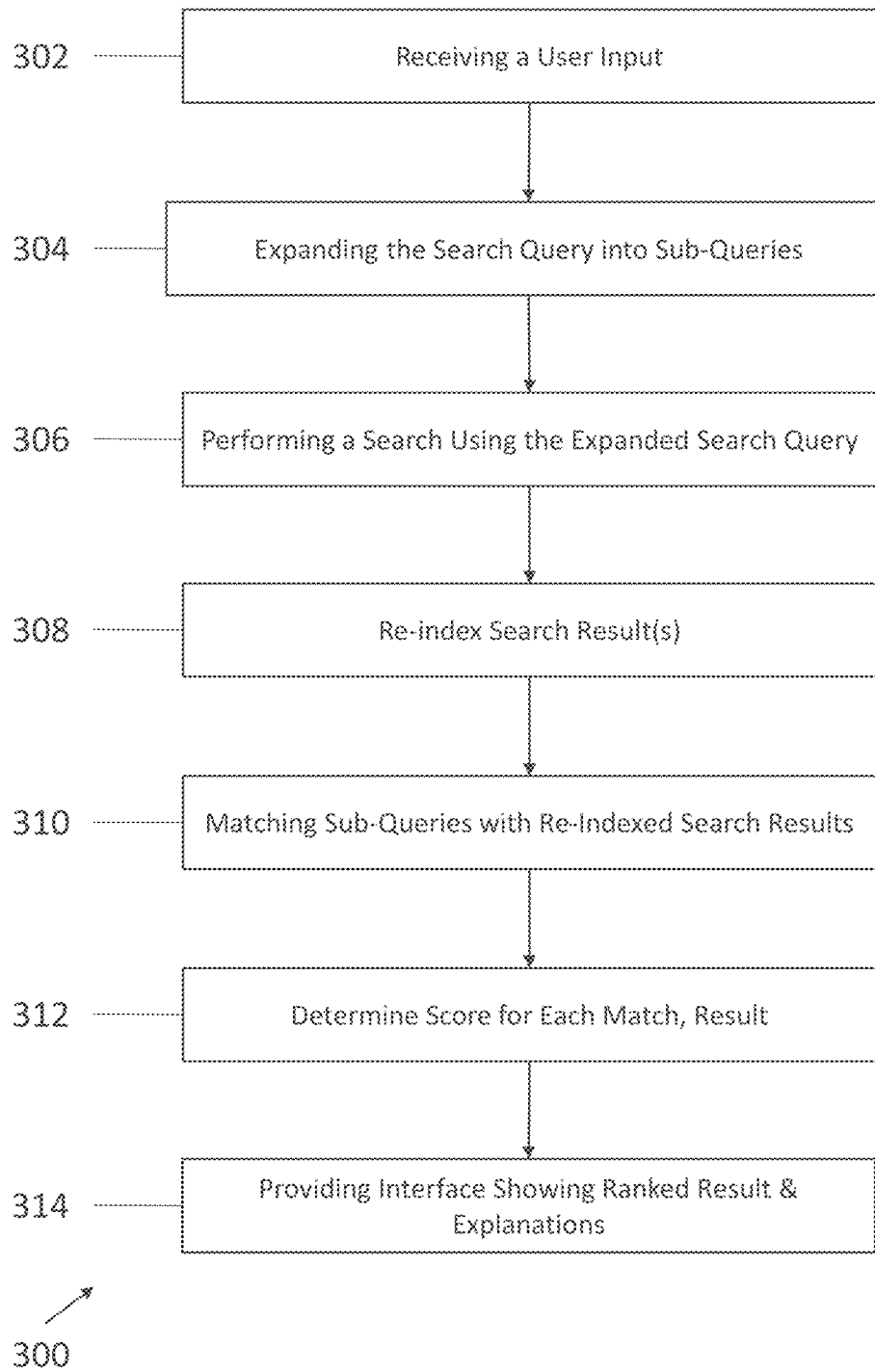
FIG. 3 is a method according to an embodiment of the present disclosure.

FIG. 3 illustrates an exemplary method 300 of search-result explanation. One or more steps of method 300 may be omitted during performance of method 300, and steps of method 300 may be performed in any order and/or in parallel. One or more steps of method 300 may be performed by one or more processors. Method 300 may be implemented as a computer-readable medium or computer program product comprising instructions which, when the program is executed by one or more computers, cause the one or more computers to carry out the steps of method 300.

The method 300 includes a step 302 of receiving a user query comprising at least one search component, such as a search term in a field such as given name, surname, etc. A step 304 may include expanding the received search query to a plurality of different types of matches, e.g. exact, initial, phonetic matches, each of these types of matches defining a subquery. For location-specific queries, the expansion may include matching based on adjacent or nearby locations as suitable. This may be performed on any number and/or types of matches and for any number of different query components.

A step 306 includes performing a search on a database using the expanded search query, i.e. the subqueries. A step 308 includes performing re-indexing, in memory, one or more returned records from the database, including the fields and content of the records. This may be performed as part of the database or separately therefrom. A step 310 includes matching the parts of the expanded query and comparing them against the re-indexed content of each record to determine which type of match occurred with each component of the query. In embodiments a particular token from the record that matched may be identified, allowing the same to be highlighted for a user. Thus it can be determined whether a given name matched exactly, phonetically, by initial, or otherwise, and so on for each component of the query. Likewise, types of matches and mismatches between one or more query components or terms, including given name, surname, dates, etc. can be determined.

A step 312 includes determining a score for each type of match and/or for each record as a whole. The score may be normalized by constructing a fictitious record that matches each component of the query exactly, so as to obtain a score reflecting a "perfect" result. This allows for normalization of weights (whether rule-based or machine-learned) for each different type of match. In an embodiment, an exact name match on a given name is worth 100, a phonetic name match on a given name is worth 80, and an initial name match is worth 20. An exact location match is worth 200, by contrast, and an adjacent name match is worth 75, in embodiments. Scores and weights for different matches vary by database, by record type, by query components, and so on. Because of the differences, specific to each query and situation, of each possible query, a perfect record generated on the fly as described herein therefore advantageously generates a denominator that normalizes all scores for all records, regardless of the types of queries and records, between 0 and 1, and allowing for ranking record matches.

A step 314 includes providing an interface comprising or showing one or more records ranked according to the quality of matches of specific fields with specific query components along with a search-result explanation module comprising information about match type(s).

Figures 4A, 4B:
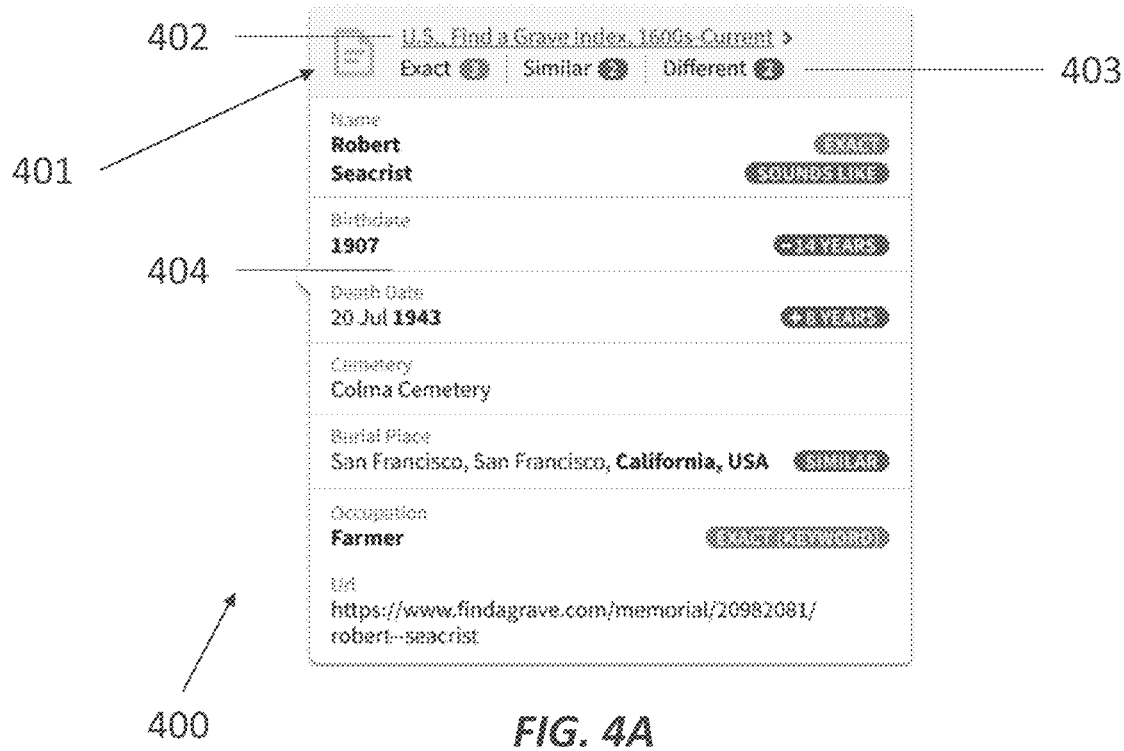
FIG. 4A is a search result interface according to another embodiment of the present disclosure.
FIG. 4B is a search result interface according to another embodiment of the present disclosure.

Turning to FIGS. 4A and 4B, another embodiment of an interface 400, 450 for displaying search-result explanations is shown and described. The interface 400 of FIG. 4A allows a user to see which components of a search query matched, and how they matched, portions of a result, such as a genealogical record in a genealogical research service. The interface 400 comprises a header 401 comprising a link or title 402 explaining or linking to the particular result, in this case a grave-related record. A section 403 summarizes the number of different types of matches: in this case, three different query components matched exactly, two different query components matched similarly, and two different query components were different than the result content.

A body section 404 comprises and details the different query components and whether they matched. For example, a name field indicates that the given name Robert, as contained and identified in the result, was an exact match while the surname Seacrist was a phonetic, i.e. "sounds like," match. The birthdate 1907 was 14 years earlier than the entered query component. The death date was 8 years later than the entered query component. The burial place was similar to the entered query component, and the occupation was an exact keyword match.

The interface 450 of FIG. 4B, similarly, comprises a header 451 comprising a link or title 452 explaining or linking to the particular result, in this case a marriage-related record. A section 453 summarizes the number of different types of matches: in this case, three different query components matched exactly, one query component matched similarly, and three different query components were different than the result content.

A body section 454 comprises and details the different query components and whether they matched. For example, a name field indicates that the given name Hector John, as contained and identified in the result, was a similar match while the surname Sanchez was an exact match. The marriage date 24 May 1978 was an exact match to the query component. The marriage place was different, as were both the given name and surnames of the spouse. The gender was an exact match.

The above examples illustrate how a user can quickly and intuitively discern, from the search-result explanations provided according to the embodiments herein, whether a particular result, such as a record returned in a search of a genealogy database, is closely related enough to warrant a closer inspection. In particular, a user may discern from the number and quality of matches whether the result is promising or not based on the multitude of different contexts that may arise in searching. For example, the user may gloss over results that poorly match a given name and/or a location, and may pay close attention to close or similar matches on other details.

While genealogy databases and genealogy-related records have been described, it will be appreciated that the disclosure is not limited thereto but rather encompasses any suitable result type and search service. For example, the depicted embodiments may be applicable to search engine services, including general searching on Google, Bing, or otherwise, database- or subject-specific searching services like Scirus, Healia, Maritime answers, site-specific search tools, internal search tools used by enterprises, modifications or combinations thereof, or otherwise.

Figure 5A:
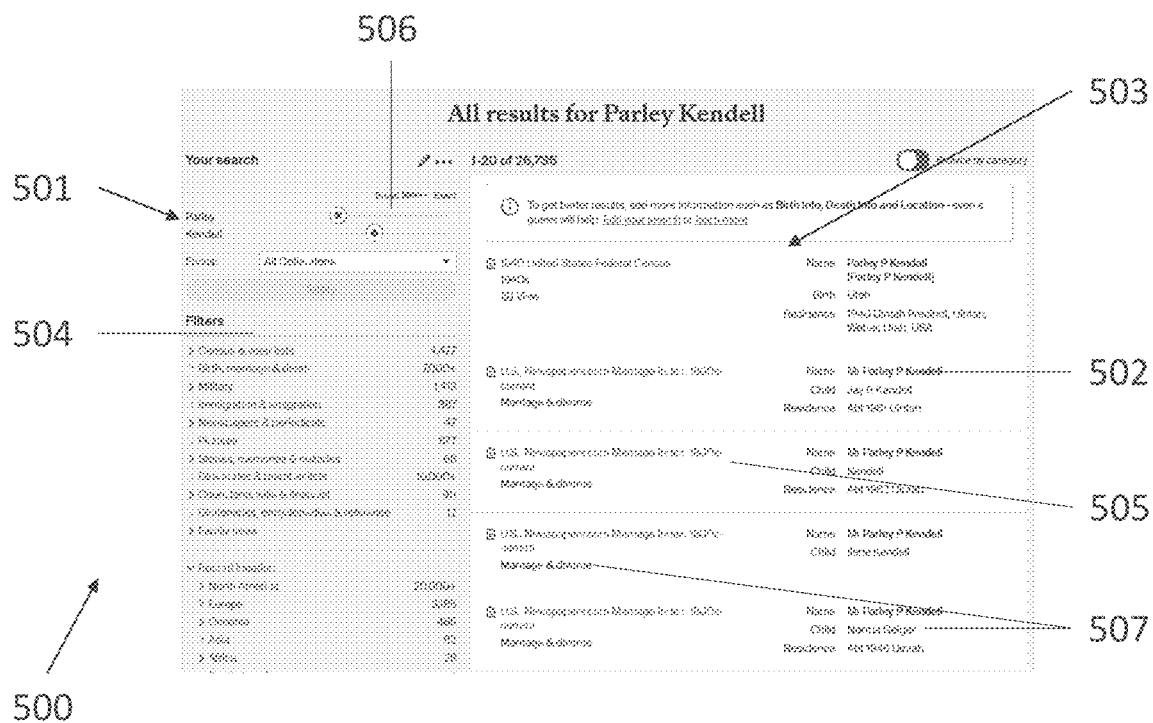
FIG. 5A is a search result interface according to another embodiment of the present disclosure.
Figure 5B:
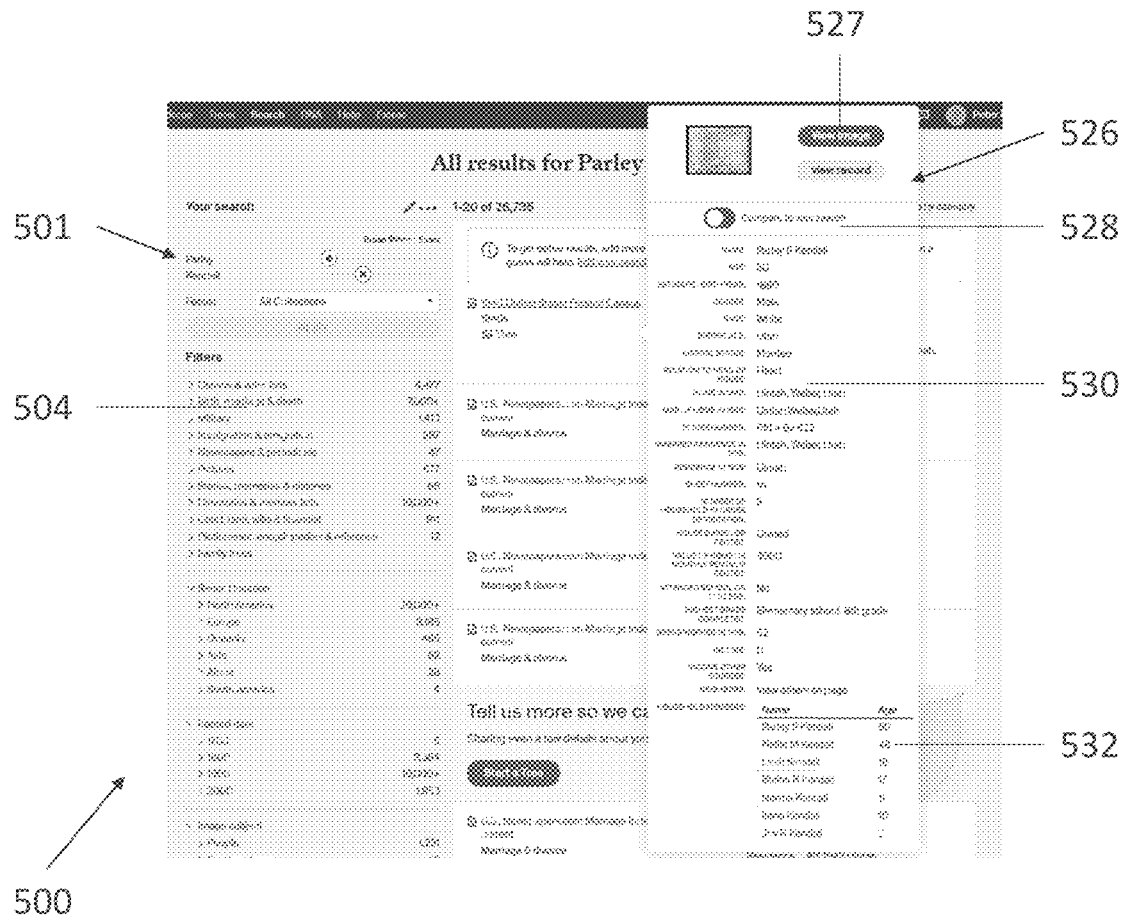
FIG. 5B is a search result interface according to the embodiment of FIG. 5A.
Figure 5C:
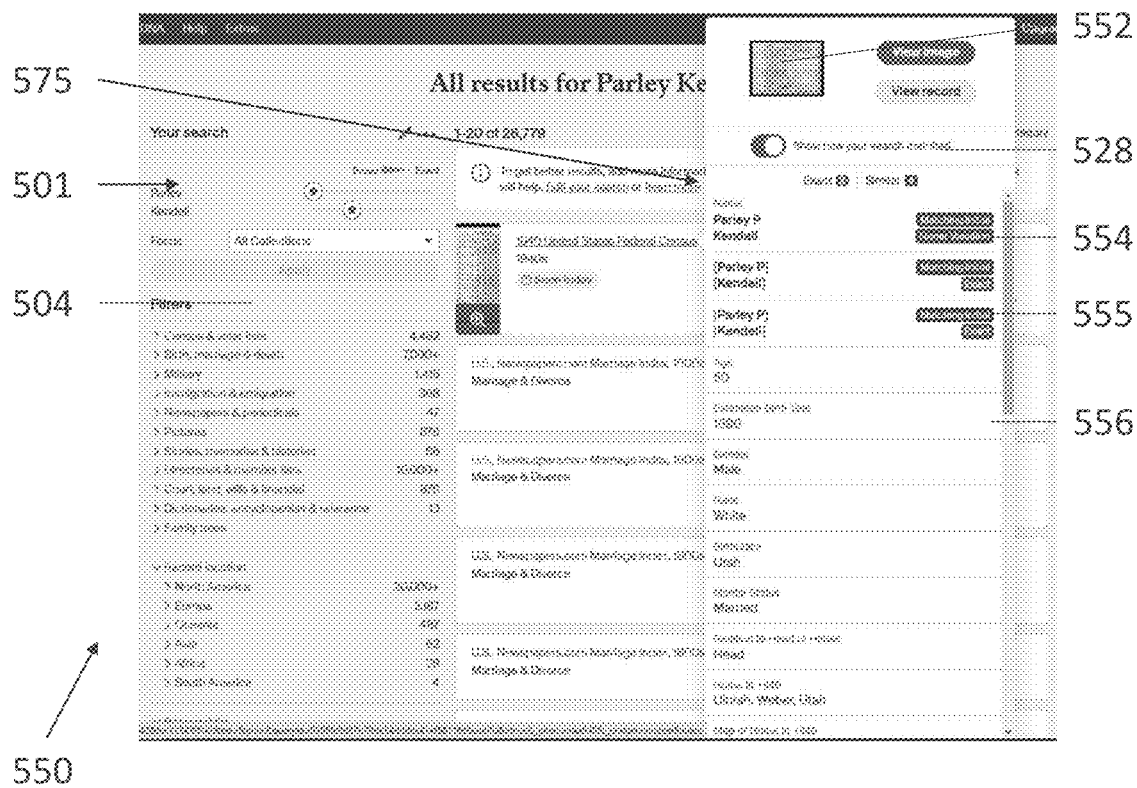
FIG. 5C is a search result interface according to the embodiment of FIG. 5A.

Turning now to FIGS. 5A-5C, an alternative embodiment of search-result explanation systems, methods, and computer-program products according to the present disclosure is shown and described. FIG. 5A shows a search interface 500, in which a user may enter a search query having one or more components such as searching by given name, surname, gender, location, record collection, birth date, death date, and etc. One or more potential results 502 may be provided to the user in the search interface 500.

For example, a user may be utilizing a genealogical research service and the results may comprise one or more historical records that may contain information about the person such as an ancestor that the user is searching for and matching one or more of the search components. The search interface 500 may show a search term section 501 where one or more components of the search query, e.g. first name and surname, are provided with a toggle 506 for broadening or narrowing the search thereon. The toggle 506 may be applied to one or more of the components of the search query and may take any suitable form, such as a slide bar or otherwise.

One or more filters 504 may be provided for narrowing the results 502, which can be provided in a results section 503 of the search interface 500. The results 502 may include a link 503 that a user can click to navigate to the particular record pertaining to that result 502, along with metadata 507 indicating the type of record, a name, relation, address, or other detail that was pertinent to the search, or any other suitable information. In embodiments, the metadata 507 may be highlighted, e.g. bolded, based on terms appearing the record 502 that also appear in the search query.

Turning now to FIG. 5B, a user interface 526 may be accessed by hovering over, clicking on, or otherwise engaging with a particular search result 502 and/or a corresponding link thereto. The user interface 526 may include one or more options 527 for viewing an image of the record 502, viewing the record 502 or navigating thereto, and/or a thumbnail image of the record 502. The user interface 502 may include a toggle 528 for comparing the record and details thereof against the search query, as will be described in greater detail below. The user interface 526 may include a more-detailed summary or metadata pertaining to the record 502 than is viewable from the interface 500, in which a plurality of records is displayed for easy navigation by a user.

The user interface 526 may show metadata 530, which in the context of genealogical research may include such data as name, age, birth year, gender, race, birthplace, marital status, relation to head of house, residence at a particular time, map, address, home ownership status, value of home, education status, employment status, income data, neighbor information, household member information, and/or any other suitable details.

Turning now to FIG. 5C, a search comparison user interface 575 is shown and described. The search comparison user interface 575 may be accessed via the toggle 528, whereupon the interface 526 transitions to the search comparison user interface 575. The search comparison user interface 575 may comprise comparisons 554, 555 that show metadata such as name details from the record along with a type of match against the search query components. For example, the comparison 554 may indicate that the detected first name "Parley P" matches on an initial, while the detected surname "Kendall" matches on a name variation. From another part of the record, the detected first name "Parley P" matches on an initial while the detected surname "Kendell" matches exactly.

The comparisons 554, 555 may be color-coded with, e.g., exact matches having a green color, partial matches having a gray color, etc. Different (e.g., ummatching) components may be shown in a maroon color, for example. In embodiments, the matching elements from a record may be bolded relative to non-matching or poorly matching elements. For example, a given name that matches a search query but a middle initial that does not match a search query may be shown in the interface with the given name bolded and the middle initial unbolded.

In embodiments, the comparisons 554, 555 may be provided as a button that a user may hover over or click to receive yet a further interface showing additional details about why (or why not) and how the record was matched to a particular search query component.

The search comparison user interface 575 may further comprise metadata 556 regarding the search result and the subject of the search, for example age, birth year, gender, race, birthplace, marital status, relation to head of house, home at a particular time, map of home, address, home ownership status, value of home, education status, employment status, income data, neighbor information, household member information, and/or any other suitable details, e.g. any of the details included in the interface 526. In embodiments, household member information may be provided as a link to a particular search query based on the household member's name, a profile for the household member, or otherwise. In embodiments, a link for learning how to refine a search is provided, which navigates a user to a page with search strategy suggestions, tutorials, and other educational material.

The provision of the search comparison user interface 575 advantageously allows for a user to gauge information about a search result via the metadata available from the interface 526, and/or to hone and refine their search strategy via the information available from the search comparison user interface 575. Not only is a user able to properly narrow, broaden, or otherwise adjust their search parameters based on the reasons for a particular record being returned, but the user is also able to learn how to search more efficiently by assessing search results and contents thereof vis-à-vis search query components. In yet further embodiments, a user may be facilitated through the search comparison user interface 575 to narrow or broaden a particular search component.

Figure 6:
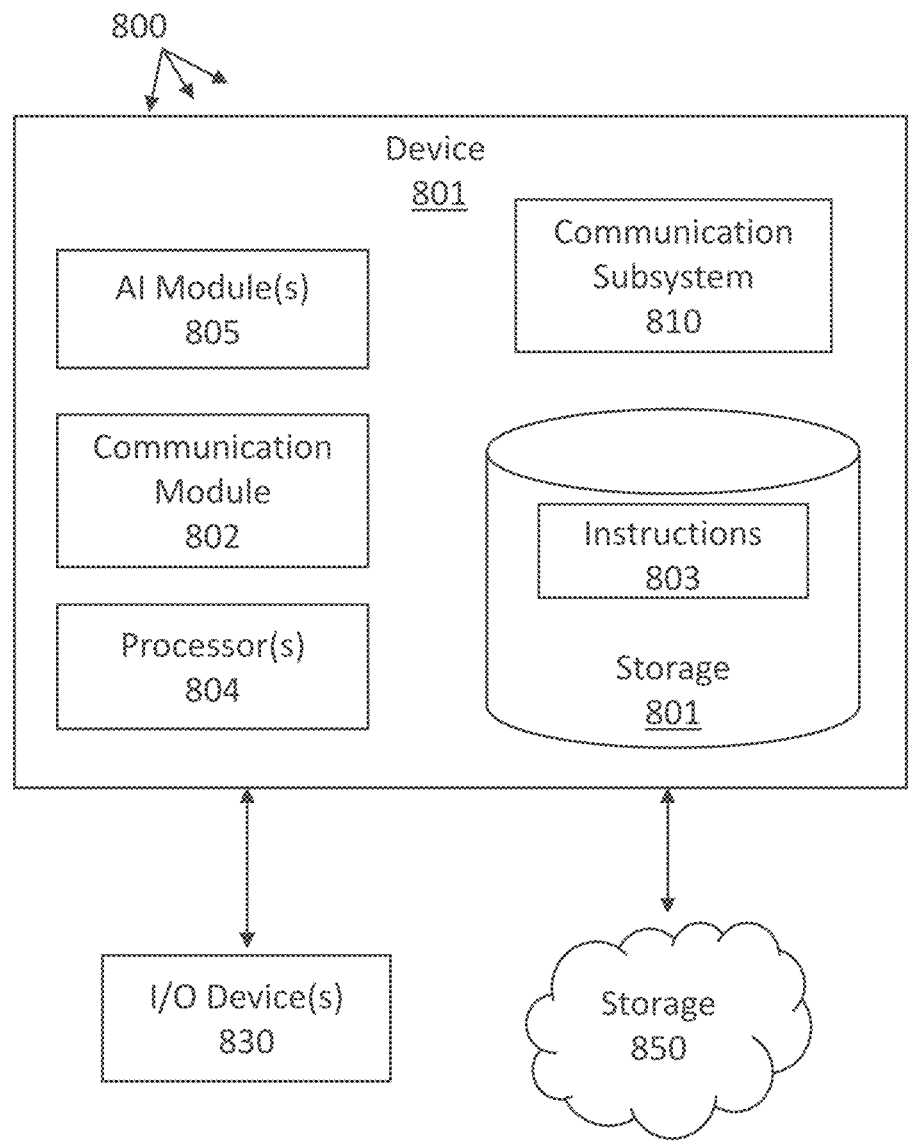
FIG. 6 is a diagram of a computer system for identifying and segmenting objects according to the present disclosure.

FIG. 6 illustrates an example computer system 800 comprising various hardware elements, in accordance with some embodiments of the present disclosure. The computer system 800 may be incorporated into or integrated with devices described herein and/or may be configured to perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, the computer system 800 includes a communication module 802, one or more processor(s) 804, one or more input and/or output device(s) 830, and a storage 801 comprising instructions 803 for implementing a data-sharding system and/or method according to the disclosure. The computer system 800 may be implemented using various hardware implementations and embedded system technologies. For example, one or more elements of the computer system 800 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of the computer system 800 may be communicatively coupled via the communication module 802. While the communication module 802 is illustrated as a single connection for purposes of clarity, it should be understood that the communication module 802 may include various numbers and types of communication media for transferring data between pertinent components such as hardware elements. For example, the communication module 802 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, the communication medium 802 may include one or more buses connecting pins of the hardware elements of the computer system 800. For example, the communication medium 802 may include a bus that connects the processor(s) 804 with the storage 801, referred to as a system bus, and a bus that connects the storage 801 with the input device(s) and/or output device(s) 830, referred to as an expansion bus. The system bus may itself consist of several buses, including an address bus, a data bus, and a control bus. The address bus may carry a memory address from the processor(s) 804 to the address bus circuitry associated with the storage 801 in order for the data bus to access and carry the data contained at the memory address back to the processor(s) 804. The control bus may carry commands from the processor(s) 804 and return status signals from the storage 801. Each bus may include multiple wires for carrying multiple bits of information and each bus may support serial or parallel transmission of data.

The processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide semiconductor field-effect transistor (MOSFET) construction. The processor(s) 804 may include one or more multi-core processors, in which each core may read and execute program instructions concurrently with the other cores, increasing speed for programs that support multithreading.

The input device(s) 830 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. The input device(s) 830 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

The output device(s) 830 may include one or more of various devices that convert information into human-readable form, such as without limitation a display device, a speaker, a printer, a haptic or tactile device, and/or the like. The output device(s) 830 may also include devices for writing to removable storage devices or other removable media, such as those described in reference to the input device(s). The output device(s) 830 may also include various actuators for causing physical movement of one or more components. Such actuators may be hydraulic, pneumatic, electric, and may be controlled using control signals generated by the computer system 800.

The communications subsystem 810 may include hardware components for connecting the computer system 800 to systems or devices that are located external to the computer system 800, such as over a computer network. In various embodiments, the communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), combinations thereof, or other suitable possibilities.

The storage 801 may include the various data storage devices of the computer system 800. For example, the storage 801 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While the processor(s) 804 and the storage 801 are illustrated as being separate elements, it should be understood that the processor(s) 804 may include varying levels of on-processor memory, such as processor registers and caches that may be utilized by a single processor or shared between multiple processors.

The storage 801 may include a main memory, which may be directly accessible by the processor(s) 804 via the memory bus of the communication module 802. For example, the processor(s) 804 may continuously read and execute instructions stored in the main memory. As such, various software elements may be loaded into the main memory so as to be read and executed by the processor(s) 804 as illustrated in FIG. 8. Typically, the main memory is volatile memory, which loses all data when power is turned off and accordingly needs power to preserve stored data.

The main memory may further include a small portion of non-volatile memory containing software (e.g., firmware, such as BIOS) that is used for reading other software stored in the storage 801 into the main memory. In some embodiments, the volatile memory of the main memory is implemented as RAM, such as dynamic random-access memory (DRAM), and the non-volatile memory of the main memory is implemented as read-only memory (ROM), such as flash memory, erasable programmable read-only memory (EPROM), or electrically erasable programmable read-only memory (EEPROM).

The computer system 800 may include software elements, shown as being currently located within the main memory, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 803, which are executable by the computer system 800. In one example, such instructions 803 may be received by the computer system 800 using the communications subsystem 810 (e.g., via a wireless or wired signal that carries the instructions 803), carried by the communication module 802 to the storage 801, stored within the storage 801, read into the main memory, and executed by the processor(s) 804 to perform one or more steps of the described methods.

In another example, the instructions 803 may be received by the computer system 800 using the input device(s) 830 (e.g., via a reader for removable media), carried by the communication module 802 to the storage 801, stored within the storage 801, read into the main memory, and executed by the processor(s) 804 to perform one or more steps of the described methods.

In some embodiments of the present disclosure, the instructions 803 are stored on a computer-readable storage medium (or simply computer-readable medium). Such a computer-readable medium may be a hardware storage device that, compared to transmission media or carrier waves, is "non-transitory" and may therefore be referred to as a non-transitory computer-readable medium. In some cases, the non-transitory computer-readable medium may be incorporated within the computer system 800. For example, the non-transitory computer-readable medium may be the storage 801 and/or the cloud storage 850 (as shown in FIG. 8).

In some cases, the non-transitory computer-readable medium may be separate from the computer system 800. In one example, the non-transitory computer-readable medium may be a removable medium provided to the input device(s) 830 (as shown in FIG. 8), such as those described in reference to the input device(s) 830, with the instructions 803 being read into the computer system 800 from the input device(s) 830. In another example, the non-transitory computer-readable medium may be a component of a remote electronic device, such as a mobile phone, that may wirelessly transmit a data signal that carries the instructions 803 to the computer system 800 and that is received by the communications subsystem 810 (as shown in FIG. 8).

The instructions 803 may take any suitable form to be read and/or executed by the computer system 800. For example, the instructions 803 may be source code (written in a human-readable programming language such as Java, C, C++, C#, Python), object code, assembly language, machine code, microcode, executable code, and/or the like. In one example, the instructions 803 are provided to the computer system 800 in the form of source code, and a compiler is used to translate the instructions 803 from source code to machine code, which may then be read into the main memory for execution by the processor(s) 804.

As another example, instructions 803 are provided to the computer system 800 in the form of an executable file with machine code that may immediately be read into the main memory for execution by processor(s) 804. In various examples, the instructions 803 may be provided to the computer system 800 in encrypted or unencrypted form, compressed or uncompressed form, as an installation package or an initialization for a broader software deployment, among other possibilities.

In one aspect of the present disclosure, a system (e.g., the computer system 800) is provided to perform methods in accordance with various embodiments of the present disclosure. For example, some embodiments may include a system comprising one or more processors (e.g., the processor(s) 804) that are communicatively coupled to a non-transitory computer-readable medium (e.g., the storage 801). The non-transitory computer-readable medium may have instructions (e.g., the instructions 803) stored thereon that, when executed by the one or more processors, cause the one or more processors to perform the methods or aspects thereof as described in the various embodiments.

In another aspect of the present disclosure, a computer-program product that includes instructions (e.g., instructions 803) is provided to perform methods in accordance with various embodiments of the present disclosure. The computer-program product may be tangibly embodied in a non-transitory computer-readable medium (e.g., the storage 801). The instructions may be configured to cause one or more processors (e.g., the processor(s) 804) to perform the methods or aspects thereof as described in the various embodiments.

In another aspect of the present disclosure, a non-transitory computer-readable medium (e.g., the storage 801) is provided. The non-transitory computer-readable medium may have instructions (e.g., instructions 803) stored thereon that, when executed by one or more processors (e.g., processor(s) 804), cause the one or more processors to perform the methods or aspects thereof as described in the various embodiments.

It is to be understood that not necessarily all objects or advantages may be achieved under any embodiment of the disclosure. Those skilled in the art will recognize that the search-result explanation systems and methods for time- and cost-efficient record search may be embodied or carried out, so it achieves or optimizes one advantage or group of advantages as taught herein without necessarily achieving other objects or advantages as taught or suggested herein.

The skilled artisan will recognize the interchangeability of various disclosed features. Besides the variations described, other known equivalents for each feature can be mixed and matched by one of skill in this art to provide or utilize a search-result explanation system and/or method for cost- and time-efficient record search under principles of the present disclosure. It will be understood by the skilled artisan that the features described may apply to other types of data, contexts, and/or models.

Although this disclosure describes certain exemplary embodiments and examples of search-result explanation systems and/or methods for cost- and time-efficient record search, it nevertheless will be understood by those skilled in the art that the present disclosure extends beyond the specifically disclosed embodiments to other alternative embodiments and/or uses of the disclosure and obvious modifications and equivalents thereof. It is intended that the scope of the present disclosure should not be limited by the particular disclosed embodiments described above, and may be extended to other uses, approaches, and contexts for image analysis, and other applications that may employ the features described herein.

What is claimed is:

1. A computer-implemented method of generating contextualized search-results from a user query of historical records, the method comprising:
   receiving a set of search results from a database comprising historical records, the search results being based on a user query;
   generating an index comprising the set of search results;
   dividing the user query into a plurality of sub-queries, each sub-query comprising a component of the user query;
   for each sub-query of the plurality of sub-queries:
     searching the index using the sub-query to identify a corresponding historical record in the index, wherein the corresponding historical record matches the component of the sub-query;
     identifying, within the corresponding historical record, a field that matches the component of the sub-query;
     determining, from among a set of possible match types comprising exact matches, initial matches, and phonetic matches, a match type between the field and the component; and
     calculating a score for the sub-query based at least on the match type for the sub-query.

2. The computer-implemented method of claim 1, further comprising generating a total score for the search result corresponding to the historical record based on the score for each sub-query of the user query.

3. The computer-implemented method of claim 1, further comprising applying a weight to the score based at least on the match type of the sub-query.

4. The computer-implemented method of claim 3, further comprising generating a total score for the search result corresponding to the historical record based on the weighted score for each sub-query of the user query.

5. The computer-implemented method of claim 4, further comprising:
   generating additional total scores for additional results in the index based on respective sub-query scores; and
   ranking the set of search results based on the total score and the additional total scores.

6. The computer-implemented method of claim 1, wherein the index is generated in volatile memory.

7. The computer-implemented method of claim 1, further comprising displaying the historical record, the score, and the match type for a search result.

8. A non-transitory computer-readable medium comprising instructions that, when executed by one or more processors of a computer system, cause the computer system to perform at least the following:
   receive a set of search results from a database comprising historical records, the search results being based on a user query;
   generate an index comprising the set of search results;
   divide the user query into a plurality of sub-queries, each sub-query comprising a component of the user query;
   for each sub-query of the plurality of sub-queries:
     search the index using the sub-query to identify a corresponding historical record in the index, wherein the corresponding historical record matches the component of the sub-query;
     identify, within the corresponding historical record, a field that matches the component of the sub-query;
     determine, from among a set of possible match types comprising exact matches, initial matches, and phonetic matches, a match type between the field and the component; and
     calculate a score for the sub-query based at least on the match type for the sub-query.

9. The non-transitory computer-readable medium of claim 8, wherein the instructions are further executable by the one or more processors to cause the computer system to generate a total score for the search result corresponding to the historical record based on the score for each sub-query of the user query.

10. The non-transitory computer-readable medium of claim 8, wherein the instructions are further executable by the one or more processors to cause the computer system to apply a weight to the score based at least on the match type of the sub-query.

11. The non-transitory computer-readable medium of claim 10, wherein the instructions are further executable by the one or more processors to cause the computer system to generate a total score for the search result corresponding to the historical record based on the weighted score for each sub-query of the user query.

12. The non-transitory computer-readable medium of claim 11, wherein the instructions are further executable by the one or more processors to cause the computer system to:
   generate additional total scores for additional results in the index based on respective sub-query scores; and rank the set of search results based on the total score and the additional total scores.

13. The non-transitory computer-readable medium of claim 8, wherein the instructions are further executable by the one or more processors to cause the computer system to generate the index generated in volatile memory.

14. The non-transitory computer-readable medium of claim 8, wherein the instructions are further executable by the one or more processors to cause the computer system to display the historical record, the score, and the match type for a search result.

15. A computer system comprising:
one or more processors; and
a non-transitory computer-readable medium comprising instructions that, when executed by the one or more processors, cause the computer system to perform at least the following:
receive a set of search results from a database comprising historical records, the search results being based on a user query;
generate an index comprising the set of search results;
divide the user query into a plurality of sub-queries, each sub-query comprising a component of the user query;
for each sub-query of the plurality of sub-queries:
search the index using the sub-query to identify a corresponding historical record in the index, wherein the corresponding historical record matches the component of the sub-query;
identify, within the corresponding historical record, a field that matches the component of the sub-query;
determine, from among a set of possible match types comprising exact matches, initial matches, and phonetic matches, a match type between the field and the component; and
calculate a score for the sub-query based at least on the match type for the sub-query.

16. The computer system of claim 15, wherein the instructions are further executable by the one or more processors to cause the computer system to generate a total score for the search result corresponding to the historical record based on the score for each sub-query of the user query.

17. The computer system of claim 15, wherein the instructions are further executable by the one or more processors to cause the computer system to apply a weight to the score based at least on the match type of the sub-query.

18. The computer system of claim 17, wherein the instructions are further executable by the one or more processors to cause the computer system to generate a total score for the search result corresponding to the historical record based on the weighted score for each sub-query of the user query.

19. The computer system of claim 18, wherein the instructions are further executable by the one or more processors to cause the computer system to:
generate additional total scores for additional results in the index based on respective sub-query scores; and
rank the set of search results based on the total score and the additional total scores.

20. The computer system of claim 19, wherein the instructions are further executable by the one or more processors to cause the computer system to cause a user device to display the historical record, the score, and the match type for a search result.

* * * * *